Patented July 25, 1950

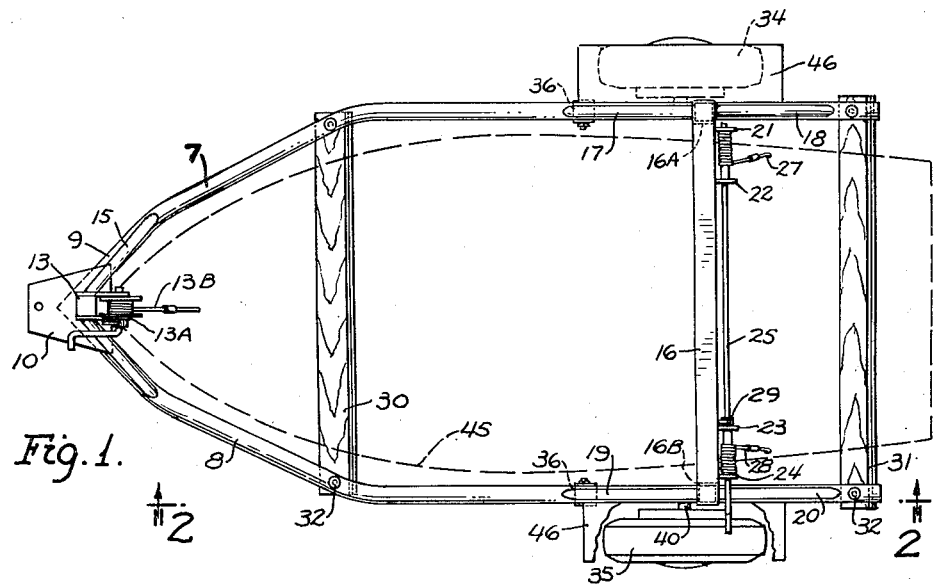

2,516,574

UNITED STATES PATENT OFFICE 2,516,574

TRAILER FOR HAULING BOATS

Leslie Holly, St. Clair Shores, Mich.

Application April 23, 1947, Serial No. 743,298

4 Claims. (Cl. 214—75)

This invention relates to automobile trailers, and has particular reference to a trailer adapted to handle boats.

An object of the invention is to generally improve trailers, and to provide a device of the character indicated which is simple in constrution, economical to manufacture, and efficient in operation.

Another object of the invention is the provision of a trailer which is constructed and arranged whereby a boat may be lifted from the water or off of the ground and may be transported from place to place.

Another object of the invention is the provision of a device of the character indicated, which is constructed and arranged so that it may be backed over a boat preliminary to hoisting the boat while the latter remains in the water.

Another object of the invention is the provision of a boat trailer which is constructed and arranged with a novel wheel suspension whereby the conventional axle is eliminated, and the central part of the trailer is free of any obstructions.

Another object of the invention is the provision of a device of the character indicated, which is provided with independent wheel suspension construction and arranged to provide great flexibility to the device when the latter is drawn over uneven terrain.

Another object of the invention, is the provision of a trailer for handling boats and the like which is provided with independent wheel suspension capable of withstanding extremely heavy thrusts.

The foregoing and other objects and advantages of the invention will become more apparent as the description proceeds, reference being made from time to time to the accompanying drawings, forming part of the within disclosure, in which drawings:

Fig. 1 is a top plan view of a device embodying the invention.

Fig. 2 is a view partly in section taken on the line 2—2 of Fig. 1.

Fig. 3 is a section taken on the line 3—3 of Fig. 2.

Fig. 4 is a section taken on the line 4—4 of Fig. 3.

Fig. 5 is a section taken on the line 5—5 of Fig. 2.

Referring now more particularly to the drawings, it will be understood that in the embodiment herein disclosed, the device consists of a pair of tubular members 7 and 8, bent and rebent as shown in Fig. 1, to form a frame closed at the front 9 and open at the rear, as at 10. A tow plate 11 is preferably welded to the front of the frame 9 so that the device may be secured to the bumper 12 (Fig. 2) of an automobile, or the like. A single spar like riser 13, preferably comprising a hollow tubular member of square cross section, is welded or otherwise secured to the front end of the frame, as at 14.

The spar 13 is reinforced by means of braces 15, which extend between the spar 13 and the respective frame members 7 and 8. A winch 13A is supported on the spar 13, and is adapted to handle the cable 13B.

An inverted U-shaped member comprising a cross member 16 and supporting legs 16A and 16B are secured to the frame members 7 and 8 by welding or other suitable means, and are reinforced by braces 17, 18, 19 and 20. Lugs 21, 22, 23, and 24 are preferably welded to the rear of the cross member 16, and are provided with central openings through which is extended a pipe or rod 25, which is adapted to be rotated by the crank 26 to serve as a plural winch, whereby the cables 27 and 28 may be wound there about. A ratchet 29 is provided to lock the member 25 in any desired position.

Removable and adjustable cross members 30 and 31 are suspended beneath the frame members 7 and 8 by means of bolts 32 and wing nuts 33. The members 30 and 31 preferably consist of angle irons 30A and 31A and wooden strips 30B and 31B. The wing nuts 33 (Fig. 5) preferably consist of a tubular member closed at the bottom to protect the threaded ends of the bolts 32.

The frame assembly is supported by rubber tired wheels 34 and 35 which are independently suspended from the member 7 and 8 respectively as hereinafter described.

Depending from each member 7 and 8 is a hanger 36 (Fig. 2) which preferably consists of a plurality of plates secured by welding or other suitable means to the underside of each frame member 7 and 8. Each hanger 36 (Fig. 4) is provided with openings adapted to accommodate a bushing 37, which is arranged to engage the pivot pin 38 about which is adapted to pivot an arm 39. A wheel spindle 40 is secured to each arm 39, and is adapted to rotatably support a wheel. A stop member 41 is positioned on the underside of each hanger 36, and is adapted to limit the downward movement of the arm 39. A coil spring 42 (Fig. 2) is interposed between the end of the arm 39 and the frame member 8. The spring 42 is prevented from being displaced by means of a retainer 43 carried at the end of the arm 39, and a cup like member 44 carried on the frame member 8.

Although I have described one of the independent wheel suspension mechanisms, it will be understood that each wheel is suspended in the same manner. Each wheel is covered by means of a mud guard or fender 46.

In order to use the device, the cross members 30 and 31 are first removed, and the frame is backed over the boat 45 so that the bow of the boat is near the spar member 13, and the stern of the boat is as near to the cross member 16 as possible. The cables 13B, 27 and 28 are then made fast to rings or other suitable means provided on the interior of the boat, and the cables are taken up by means of the winches. After the boat has been lifted from its resting place on the ground or in the water, the members 30 and 31 are then secured in position, and the boat 45 may be lowered on to them for rigid support during transportation.

Having described my invention, what I claim and desire to secure by Letters Patent is:

1. In a device of the character described, including a frame, means on said frame for hoisting and suspending a boat, and wheels for supporting said frame, the combination of means for independently suspending said wheels, said last named means comprising a hanger rigidly depending from the underside of said frame, bearing means on said hanger for accommodating a pivot pin, an arm pivoted at one end to said hanger, a wheel spindle secured to the side of said arm intermediate its ends, retainers on said arms and said frame, and a coil spring between said arm and said frame in cooperation with said retainers.

2. The combination defined in claim 1, in which said means for hoisting the boat include an inverted U-shaped riser mounted at the top of said frame adjacent the wheels, said U-shaped riser having a rotatable tubular member mounted transversely thereon, said rotatable tubular member having a crank for rotating the same, and a ratchet for locking the same against rotation.

3. In a device of the character described in combination, a frame consisting of a pair of diverging tubular members, an inverted U-shaped riser secured to said frame, a spar-like riser secured to the convergent end of said frame, removable cross members secured to the underside of said frame, and an independent wheel suspension consisting of a hanger rigidly suspended from the underside of said frame, an arm pivoted to said hanger, a wheel spindle secured to the side of said arm and adapted to support one of said wheels, a coil spring interposed between the free end of said arm and said frame, and means cooperating between said arm and said spring and between said frame and said spring for retaining the said spring against displacement.

4. In a device of the character described in combination, a frame consisting of a pair of diverging tubular members, an inverted U-shaped riser secured to said frame, a spar-like riser secured to the convergent end of said frame, removable cross members secured to the underside of said frame, and an independent wheel suspension consisting of a hanger rigidly suspended from the underside of said frame, an arm pivoted to said hanger, a wheel spindle secured to the side of said arm and adapted to support one of said wheels, a coil spring interposed between the free end of said arm and said frame, and means on said hanger for limiting the movement of said arm away from said frame.

LESLIE HOLLY.

REFERENCES CITED

The following references are of record in the file of this patent:

UNITED STATES PATENTS

| Number | Name | Date |
| --- | --- | --- |
| 1,101,217 | Stamm | June 23, 1914 |
| 1,531,180 | Erickson | Mar. 24, 1925 |
| 2,256,038 | Woodruff | Sept. 16, 1941 |
| 2,260,676 | Lafaye, Sr. | Oct. 28, 1941 |
| 2,296,611 | Green | Sept. 22, 1942 |
| 2,415,771 | Van Agtmael | Feb. 11, 1947 |
| 2,425,252 | Larson | Aug. 5, 1947 |
| 2,427,667 | Gilbert | Sept. 23, 1947 |

FOREIGN PATENTS

| Number | Country | Date |
| --- | --- | --- |
| 470,114 | Great Britain | Aug. 10, 1937 |